3,514,947
CONTROL SYSTEMS
Joseph Lewis Bloom, Baie D'Urfe, Quebec, Canada, assignor to Joseph Lucas (Industries) Limited, Birmingham, England
Filed Nov. 5, 1968, Ser. No. 773,570
Int. Cl. F02c 9/08
U.S. Cl. 60—39.28                2 Claims

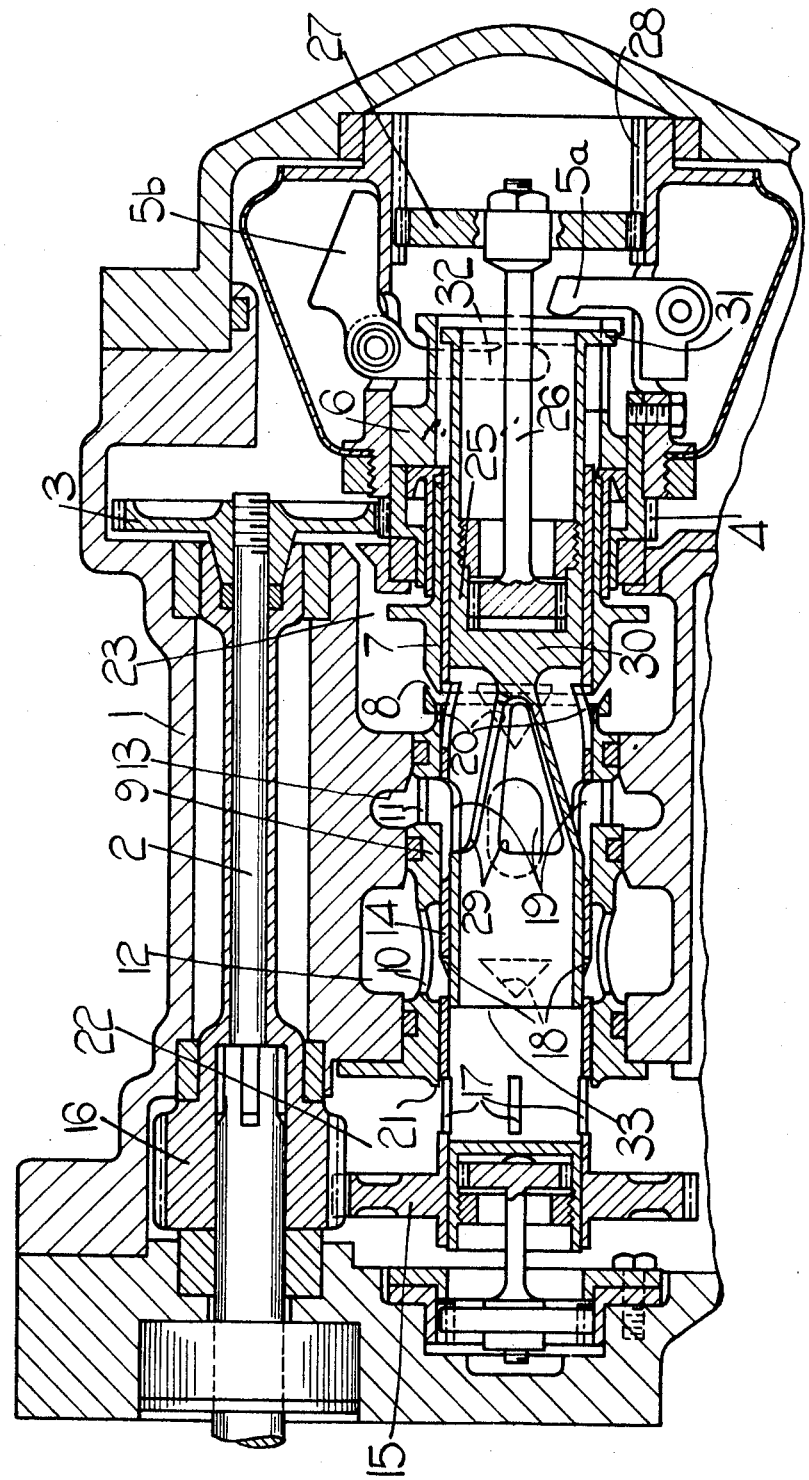

ABSTRACT OF THE DISCLOSURE

A fuel control apparatus for a gas turbine engine comprising a first valve having a fixed outer sleeve, an axially movable outer sleeve, a first axially movable inner sleeve within the outer sleeves, the movable sleeves being movable in response to engine speed and pressure changes respectively, and a second valve having a further inner sleeve axially movable within the first inner sleeve in response to engine speed changes, the inner sleeves having openings through which flow of fuel to the engine takes place, the relative axial positions of the inner and outer sleeves determining the fuel flow to the engine.

---

This invention relates to fuel control systems for gas turbine engines including apparatus of the kind comprising a first valve including a fixed outer sleeve, an axially movable outer sleeve movable by means of a first one of a pair of engine driven speed responsive devices, and an inner sleeve axially slidable within the two outer sleeves, the inner sleeve being axially movable by means responsive to changes in pressures obtained from the engine, the inner sleeve having at least one control orifice, through which fuel must flow to the engine, the area of the orifice or orifices being determined by the relative positions of the outer and inner sleeves, and a second valve including a further axially movable sleeve, movable by means of a second one of the pair of engine driven speed responsive devices, and also by the pressure drop created by flow through the orifice or orifices in the inner sleeve, the axial position of the further sleeve controlling the outlet of fuel from the first valve.

In previously proposed constructions, the first and second valves are arranged in end-to-end relationship. With the associated separate speed responsive devices and means whereby the parts, or some of them, are rotated relatively to one another, the assembly is of substantial length and in certain installations, this is undesirable or even unacceptable.

The object of the invention is to provide a fuel control apparatus of the kind referred to in which the length of the assembly of valves is minimised.

In accordance with the present invention there is provided a fuel control apparatus for a gas turbine engine comprising a first valve including a fixed outer sleeve, an axially movable outer sleeve movable by means of a first one of a pair of engine driven speed responsive devices, and a first inner sleeve axially slidable within the two outer sleeves, the first inner sleeve being axially movable by means responsive to changes in pressures obtained from the engine, the first inner sleeve having at least one control orifice, through which fuel must flow to the engine, the area of the orifice or orifices being determined by the relative positions of the outer and inner sleeves, and a second valve including a further inner sleeve slidably mounted within the first inner sleeve, said first inner sleeve having at least one second control orifice through which fuel from the first valve must also flow, the axial position of the further inner sleeve being movable by means of the second of the pair of engine driven speed responsive devices, and also by the pressure drop created by the flow of fuel through the first valve, the axial position of the further inner sleeve determining the area of the second control orifice or orifices available for flow of fuel therethrough.

An embodiment of the invention will now be described by way of example with reference to the accompanying drawing which is a sectional view of a fuel control apparatus for a gas turbine engine constructed in accordance with the invention.

Referring to the drawing the apparatus comprises a composite body 1 in which is mounted a power input shaft 2. The power input shaft is arranged to be driven by the associated engine and carries a gear 3 meshing with a further gear carried on a member 4 which in turn carries two sets of pivotally mounted weights 5a and 5b which comprise a pair of speed responsive devices respectively. The set of weights 5a act against the end of a sleeve 6 which in turn engages an axially movable outer sleeve 7. The sleeve 7 has an annular opening 8 near one of its ends being that end remote from the weights 5a. This end of the sleeve 7 moves relative to a fixed outer sleeve 9 mounted in the body 1 and in which are provided two sets of openings 10, 11 communicating with main and pilot outlets 12, 13 formed in the body respectively.

Axially slidable within the fixed and movable outer sleeves 7 and 9 is a first inner sleeve 14. This first inner sleeve 14 is rotatably mounted within the two outer sleeves 7 and 9 and carries a gear 15 meshing with a further gear 16 carried on the power input shaft 2.

In the first inner sleeve 14 are four spaced sets of openings indicated at 17, 18, 19 and 20 respectively. The openings 17, 18 and 20 constitute control orifices and an edge 21 of the fixed outer sleeve 9 determines the area of the opening 17 which are available for flow of fuel therethrough in accordance with the position of the first inner sleeve 14. The openings 18 are triangular, as are those indicated at 20. The openings 19 are oblong.

Inlets (not illustrated) through the interior of the body feed fuel from a pump (not illustrated) to the interior of chambers 22, 23 communicating with the openings 17, 20 respectively. The annular inlet 8 of the movable outer sleeve 7 is also in communication with the interior of the chamber 23 in the body 1 and fuel can enter the interior of the first inner sleeve 14 through these sets of openings 17 and 20, through the areas of the openings 20 available for flow are determined by the relative positions of the movable outer sleeve 7 and the first inner sleeve 14.

The axial position of the first inner sleeve 14 is determined by a pressure responsive capsule 24, connection between the capsule 24 and the sleeve 14 being through a linkage (not illustrated) at the left hand end of the apparatus.

Disposed within the first inner sleeve 14 is a further inner sleeve 25 which is connected to a quill shaft 26 carrying a gear 27 which meshes with an internally toothed ring 28 rotatable with the assembly of weights 5a and 5b.

The further inner sleeve 25 is divided into two tubular portions by a conical portion in which are formed a plurality of triangular openings 29. The narrow end of the conical portion of the further inner sleeve 25 is connected to a wall which separates the interiors of the two tubular portions of this sleeve. The end of the further inner sleeve 25 adjacent to the weights 5a, 5b is flanged at 31 engageable by arms 32 connected to the pivotally mounted weights 5b.

In use, fuel enters the interior of the first inner sleeve 14 through the openings 17 and 20 therein, and can also reach the interior of the further inner sleeve 25 at its end portion remote from the weights 5b through its open end, and through the openings 29 therein respectively. The outlet of fuel from the interior of these inner sleeves 14 and 25 occurs through the openings 29 and 19 to the pilot outlet 13 in the body 1, and to the main outlet 12 through the triangular openings 18 when the further inner sleeve 25 has moved to the right as viewed in the drawing, this occurring under the action of the weights 5b when the apparatus is driven by the associated engine. The position of the edge 33 of the sleeve 25 control the outlet through the openings 18.

The pressure drop occurring across the openings 20 in the first inner sleeve 14 is applied at opposite sides respectively of the wall 30 of the further inner sleeve 25 so that this pressure drop also controls the position of this further inner sleeve.

The arrangement affords a relatively short and compact form of apparatus.

Having thus described my invention what I claim as new and desire to secure by Letters Patent is:

1. A fuel control apparatus for a gas turbine engine comprising a first valve including a fixed outer sleeve, an axially movable outer sleeve movable by means of a first one of a pair of engine driven speed responsive devices, and a first inner sleeve axially slidable within the two outer sleeves, the first inner sleeve being axially movable by means responsive to changes in pressures obtained from the engine, the first inner sleeve having at least one control orifice, through which fuel must flow to the engine, the area of the orifice or orifices being determined by the relative positions of the outer and inner sleeves, and a second valve including a further inner sleeve slidably mounted within the first inner sleeve, said first inner sleeve having at least one second control orifice through which fuel from the first valve must also flow, the axial position of the further inner sleeve being movable by means of the second of the pair of engine driven speed responsive devices, and also by the pressure drop created by the flow of fuel through the first valve, the axial position of the further inner sleeve determining the area of the second control orifice or orifices available for flow of fuel therethrough.

2. A fuel control apparatus as claimed in claim 1 in which the further inner sleeve has at least one opening through which fuel flowing through the first opening or openings in the first inner sleeve can flow.

References Cited

UNITED STATES PATENTS

| 2,689,606 | 9/1954 | Mock | 137—53 X |
|---|---|---|---|
| 3,076,311 | 2/1963 | Johnson | 60—39.28 |
| 3,085,397 | 4/1963 | Jubb et al. | 60—39.28 |
| 3,091,925 | 6/1963 | May et al. | 60—39.28 |
| 3,092,966 | 6/1963 | Kuzmitz | 60—39.28 |
| 3,131,750 | 5/1964 | Turner | 60—39.28 |
| 3,139,892 | 7/1964 | McRoberts | 60—39.28 X |
| 3,175,358 | 3/1965 | Jubb et al. | 60—39.28 |
| 3,310,939 | 3/1967 | Curran et al. | 60—39.28 |

FOREIGN PATENTS 892,857  4/1962  Great Britain.

AL LAWRENCE SMITH, Primary Examiner

U.S. Cl. X.R.

137—54